July 28, 1931. W. HEYNER ET AL 1,816,282
METHOD AND TOOL FOR SECURING WIRE SCREW THREADS TO WOODEN MEMBERS
Filed Nov. 23, 1927  2 Sheets-Sheet 1
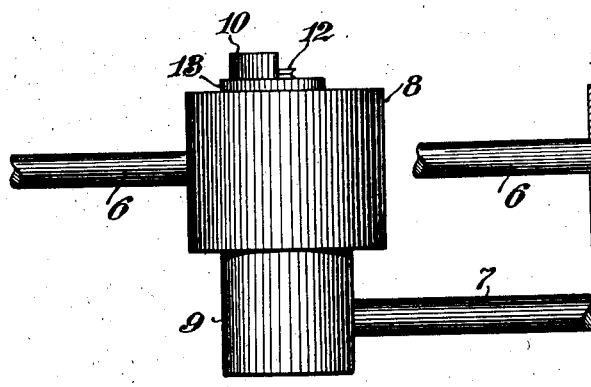
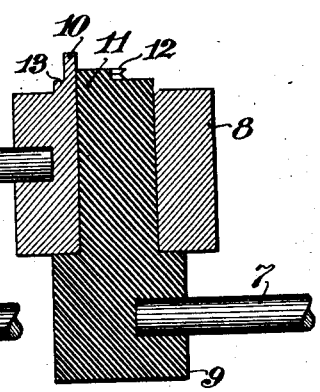
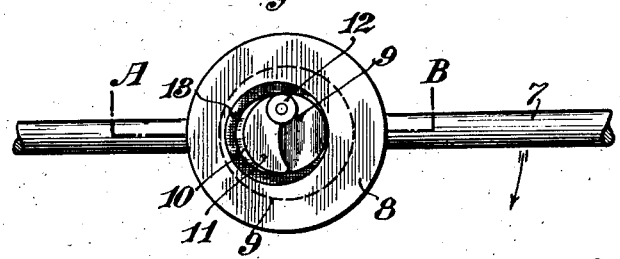
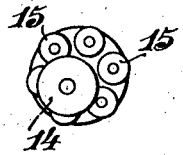
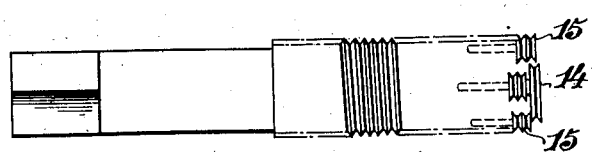
Inventors:
Willi Heyner
and Hermann Henkel
By
Attorney.

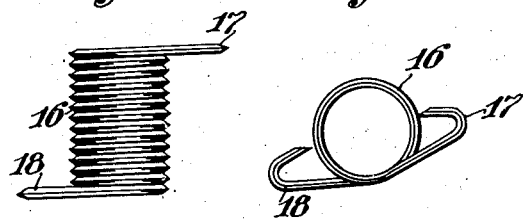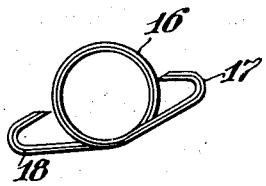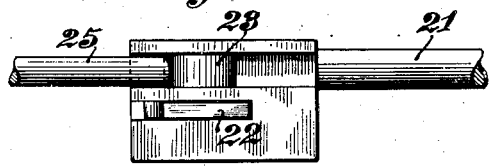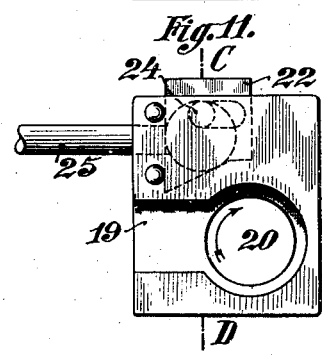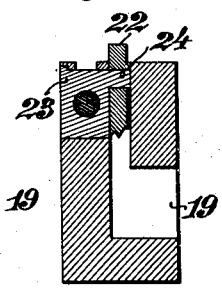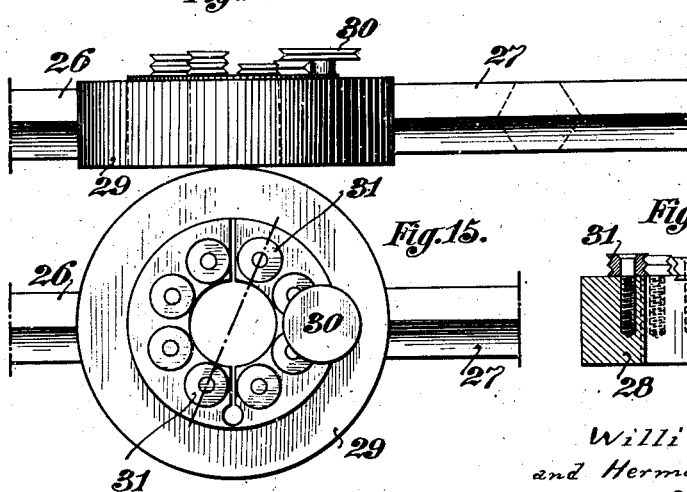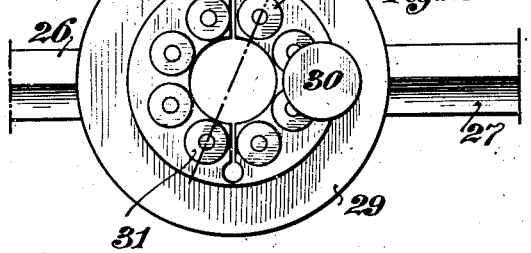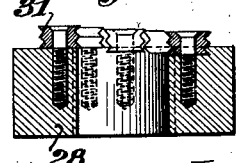

Patented July 28, 1931

1,816,282

UNITED STATES PATENT OFFICE

WILLI HEYNER, OF BERLIN, AND HERMANN HENKEL, OF NEUKOLLN, NEAR BERLIN, GERMANY

METHOD AND TOOL FOR SECURING WIRE SCREW-THREADS TO WOODEN MEMBERS

Application filed November 23, 1927, Serial No. 235,234, and in Germany November 26, 1926.

Our invention relates generally to improved means for joining together wooden articles or members with the aid of wire helices, and more particularly to the manufacture of metallic screws and threads in connecton with wooden members to be joined together.

We are aware of the fact that wire helices or helical springs have been suggested heretofore for similar purposes. Thus conical wire helices are used for fixing the tapering end of a handle to a broom head or the like; but experience shows that wooden handles, plugs, or pegs cannot be fixed in a reliable manner to a broom or the like by means of a conical wire helix. Now as far as our knowledge goes cylindrical wire helices having a close narrow pitch, have also been suggested heretofore for fixing a handle to a head or the like by inserting the wire helix into a bore or hole of adequate diameter and subsequently inserting the properly pointed handle into the wire helix by turning movements. But as the pointed end of the handle gradually engages in the bore or hole, the wire helix will follow and turn together with the handle until it reaches the bottom face of the hole In case of holes of a comparatively small diameter the helix must obviously be made of correspondingly thin wire, whence it follows that the lower most turns or convolutions of the helix overlap each other, since the upper end of the wire helix is not fixed to the handle and the lower end thereof cannot catch hold of the handle end because the latter is pointed and necessarily must be pointed. Likewise such wire helix cannot be used for fixing or interconnecting plugs for the reason that the windings or convolutions of the helix will move towards the front face of the plug when the faces are to be gathered or screwed up. In general all of the known screws of the kind may be adapted for use in bottomed holes, but they cannot serve for a regular screw connection in wooden members for want of any fixed seat or abutment.

The object of our invention is to provide a new method of and means for joining wooden objects or members in a manner similar to the usual interconnection of threaded metallic objects or parts, or in other words to solve the problem of providing metallic threads in and on wooden objects or members similar to usual threads of metallic objects.

With this aim in view we employ helical springs or wire helices which in themselves are well known, for use as external threads and as internal threads, and we attach the said helical springs to the wooden objects by firmly connecting the ends thereof with the latter, as will be explained more in detail with reference to the accompanying drawings forming a part of this specification and wherein the particular construction and shape of the helical springs or wire helices and the tools for the application and fixation thereof in the wooden objects or bodies are clearly illustrated.

Before proceeding to describe the construction thereof which we have selected as best embodying our invention, however, we desire to have it understood that said construction is not the only embodiment of which our invention is capable, that a wide range of equivalents may be employed for certain parts which we have illustrated and will hereinafter describe, and that the phraseology which we have adopted is for the purpose of description and not of limitation except where the sense absolutely requires it.

In the drawings:—

Fig. 1 is an elevational view of a wire helix as employed, according to our invention, for internal threads; Fig. 2 is an end view thereof; Fig. 3 is an elevational view of the tool employed for fixing one end of the wire helix shown in Figs. 1 and 2, in the cylindrical bore or hole of a wooden object or member; Fig. 4 is an end view thereof; Fig. 5 is a sectional view taken on the line 5—5 of Fig. 4; Fig. 6 is a plan view of a tool employed for contracting and embedding the several turns of the helix in the wall of the bore of the wooden member; Fig. 7 is an end view thereof; Fig. 8 is a view similar to Fig. 1 of a wire helix employed, according to our invention, for external threads adapted to co-operate with or engage in the internal threads of the helix shown in Fig. 1; Fig. 9 is an end view thereof; Fig. 10 is a front view of a tool employed for fixing one end of the wire helix shown in Fig. 8 to the wooden member such as a plug or peg; Fig. 11 is a plan view thereof; Fig. 12 is a side view thereof taken in the direction of the arrow of Fig. 11; Fig. 13 is a sectional view on the line 13—13 of Fig. 11; Fig. 14 is a side view of a tool for contracting and embedding the wire helix shown in Fig. 8 in the said plug and for fixing the other end thereof to the latter; Fig. 15 is a plan view thereof; and Fig. 16 is a sectional view of the inner parts thereof.

The same reference symbols are used in the different figures to denote corresponding parts.

As shown in Figs. 1, 2, 8, and 9 we use a helically wound coil or helix made of wire of suitable preferably square cross-section. In case of a wire helix to be inserted as a lining into the bore or hole of a wooden member in order to constitute an internal thread, the wire is wound in close intercontacting turns to form a helix 1, as shown in Fig. 1, of cylindrical shape and uniform size corresponding to the size of the said bore or hole and the size of the counter-helix to be subsequently united therewith. The two ends 2 and 3 of the properly coiled wire are bent inwards and outwards to form angles with pointed extremities extending substantially radially towards the periphery of the structure, as will be readily understood on inspection of Fig. 2, for purposes as hereinafter explained.

The wire helix 1 is inserted into the bore of the wooden member and one extremity thereof, for instance 2, is then forced into the wall of the bore by means of the tool illustrated in Figs. 3 to 5. The tool comprises two cylindrical parts 8 and 9 each provided with a handle 6 and 7, respectively, and the one mounted in the other one so as to be capable of rotation therein. The outer part 8 is provided, at its one end, with a stepped projection 10, and the inner part 9 is equipped with a laterally grooved pressure lug 11 and a pressure roller 12. In operation the projection 10 is inserted into the accessible front end of the wire helix 1 which had been previously placed in the bore of the wooden member, and as the projection 10 is eccentrically displaced with relation to the cylindrical hole of the part 8 in which the part 9 is inserted, for the amount of twice the depth of the thread, the pressure roller 12 the periphery of which coincides with that of the inner part 9 of the tool, will act upon the hooked end 2 of the wire helix and will force the same into the wood of the bore of the member, when the handle 7 is manually rotated in the direction of the arrow in Fig. 4. The end 2 of the wire helix is bent back in this way and returned to circular or helical alinement with the turns of the helix while the pointed extremity thereof is embedded in the wood in order to secure the wire helix in its place.

The step 13 of the projection 10 is a supplementary means co-operating with the operative end of the part 9 of the tool to exactly fit in the bore of the wooden member or, in other words, to supplement the operative end of the tool to obtain substantially the same diameter as that of the bore, so that the coil or helix will be constrained to embed itself into the walls of the bore or hole in which it is to be inserted, for a desirable amount of say 2 mm. in case of a helix made of a wire of a square cross-section of 4 mm. taken on the diagonal.

Upon having fixed the front or outer end of the wire helix in the manner described the tool shown in Figs. 6 and 7 is to be applied for finishing purposes. This tool is, generally speaking, similar to a screw-tap, as regards form and manipulation. The operative end of the tool is provided with a main roller 14 and a set of symmetrically arranged pressure rollers 15, all of the said rollers being properly mounted for rotation in the end face of the tool, the main roller 14 serving to hold and guide the turns of the wire so that they will be properly assembled and prevented from displacement and come in alining contact with the peripheral grooves of the pressure rollers 15 shaped and arranged to form a continuation of the thread provided on the periphery of the operative end of the tool and partially indicated in Fig. 6 by dash-and-dot lines. The main roller 14 is located in the diameter of the body or core of the thread K, see Fig. 1, of the helix, and the pressure rollers are mounted in the tool on pins so that their peripheral grooves will coincide with the outermost thread of the tool.

Regarding the size and form of the pressure rollers 15 they are so dimensioned and shaped that when the tool is inserted into the hole or bore of the wooden member lined with the wire helix, and caused to rotate therein, the latter will be pressed into the walls of the hole, thread by thread, to the full amount of the depth of the thread. To this end the tool is formed with a square head so as to afford a good purchase for a wrench or other tool for manipulating the same. As the tool proceeds to thus embed the wire helix into the walls of the hole, first the main or guiding roll 14 will, at the end of the rotating operation, engage the bent portion 3 and bend the same back into the circular form so that the pointed extremity will be pressed into the wood for the anchoring purpose, and subsequently the rollers 15 will act to finish the work by fully embedding the portion 3 and the pointed extremity thereof into the wood so that the whole length of the wire of the helix will lie evenly and snugly embedded in the wood and with its extremities firmly secured therein so as to form an accurately threaded lining for the reception of a co-operating screw.

In the manufacture of the external screw we provide a wooden plug (not shown) with a similar wire helix, and we employ for the purpose a wire corresponding in size and section to the wire used for making the internal thread helix shown in Fig. 1. We have shown the wire helix 16 to be applied to the plug, in Figs. 8 and 9, and it will be seen that the same is of cylindrical shape with the single turns or windings close by each other and of an internal diameter corresponding to the diameter of the plug to be connected therewith. The two ends 17 and 18 of the coiled wire are bent outwards and inwards and have pointed extremities.

A wire helix 16 constructed in the described manner is attached to the plug and inserted into the hole 20 of the tool illustrated in Figs. 10 to 13. The hole or opening 20 is provided with a recess 19 for the reception of the wire end 17, and the tool serves for the operation of fixing the wire end 17 to the plug.

To this end the tool is provided with a handle 21 and a pressure slide 22 mounted on a pin 24 integral with and eccentrically projecting from a rotatable bolt 23 so as to be capable of or adapted for movements towards and away from the groove or recess 19, a handle 25 being firmly connected with the bolt 23 for actuation thereof. The plug with the wire helix thereon being inserted into the opening 20 of the tool, the former is turned for a quarter of a revolution in the direction of the arrow shown in Fig. 11, whereby the pointed end or hook 17 will be placed below or in front of the pressure slide 22, whereupon the handle 25 is to be turned in the direction of the arrow shown in Fig. 11 until the same engages the handle 21. The movement of the handle 25 results in a corresponding movement of the bolt 23 and of the pin 24 integral therewith. As the pin 24 permanently engages in a slot of the pressure slide 22, the latter will be moved, upon the rotation of the handle 25, vertically downwards, in Fig. 11, that is, towards the opening 20. The lower or inner end face of the slide 22 is shaped to conform to the radius of the wire helix 16 and recessed according to the profile of the wire for the latter to snugly fit therein so that the pointed end 17 will be prevented from accidental displacement.

When the bent end or hook 17 of the wire helix has been properly fixed to the wooden plug by means of the tool shown in Figs. 10 to 13, the next step of the new method resides in the application of the tool illustrated in Figs. 14 to 16 and provided with the arms or handles for manipulation in the manner of a screw-stock. The inner member or head 28 of the tool is slotted or split and provided with internal threads and adapted to be placed in the outer member or holder 29. The inner member 28 is provided with a main or guiding roller 30 and a set of symmetrically located pressure rollers 31, the arrangement of the said rollers being, from a general aspect, somewhat similar to the roller arrangement hereinbefore described with reference to Fig. 7. Accordingly the rollers are peripherally grooved and the grooves of the pressure rollers 31 correspond to the internal thread of the member 28. As regards the function of the several rollers the same is substantially similar to that of the rollers shown in Fig. 7. The tool is applied to the plug with the wire helix 16 attached thereto as described with reference to Figs. 10 to 13, by placing the same on the helix 16 and revolving the same in the manner of a screw-stock by means of the handles 26 and 27, until the rollers 30 and 31, with the guiding roller 30 ahead, have compressed the wire helix and embedded the same into the wood to the depth of the thread and with the pointed end 18 firmly secured in the wood, so that the wire helix will form a regular, rigid, metallic thread on the plug of a somewhat smaller diameter than that of the helix in its original condition.

It goes without saying that instead of wood any other appropriate material may be used for purposes aimed at by the present invention. At any rate the invention provides most suitable means for joining together separate members of wood or any other appropriate material in the reliable manner of a metallic screw connection, and it is a particular advantage that by the use of a system of rollers the operation of compressing, rigidifying and fixing the wire helices can be carried out without requiring any expenditure of excessive power or a skilled hand. The thread or helix is seated or embedded in the wood or the like so firmly that, as experiments and tests have shown, excessive strains may cause the wood to break but the metallic threads thereon cannot be displaced thereby.

In this regard, therefore, a metallic connection according to the present invention is by far superior to any wooden screw connection and highly practical from both the standpoint of the manufacturer and the standpoint of the user, since the same may be manufactured at a comparatively low cost so as to be less expensive than wooden screws hitherto employed. Evidently the invention is a new departure in many branches of industry particularly in those where wooden articles are manufactured or wooden parts are to be interconnected.

What we claim is:—

1. A method for securing screwthreads of metallic wire helically wound side by side and having tapered ends to wooden members or the like, which comprises applying pressure on the threads in a direction approximately radial to the axis of the wire helix by rolling to embed the wire into the wood; and securing one tapered end of the wire into the wood.

2. A method for securing screwthreads of metallic wire helically wound side by side and having tapered ends to wooden members or the like, which comprises in securing one end of the wire into the wooden member; applying pressure on the threads in a direction approximately radial to the axis of the wire helix by rolling to embed the wire into the wood; and securing the other tapered end of the wire into the wood.

3. A method for securing screwthreads of metallic wire having a square cross-section and helically wound side by side on one edge and having tapered ends, which comprises in applying pressure on the threads in a direction approximately radial to the axis of the wire helix and diagonal to the square of the wire by rolling to embed the wire into the wood to the depth of one-half the length of the diagonal; and securing one tapered end of the wire into the wood.

4. A tool for securing a metallic wire helix to a wooden member or the like, comprising a member having a plurality of pressure rollers in an end face thereof, said rollers being rotatably mounted and grooved to contact with the helix to embed it by rolling into the wood and force the end thereof securely into the wood.

5. A tool for securing a metallic wire helix to a wooden member or the like, comprising a member having in its end face a plurality of pressure rollers arranged on a helix of a pitch equal to that of the wire helix, said rollers being rotatably mounted and grooved to contact with the wire helix to imbed it by rolling into the wood and force the end thereof securely into the wood.

6. A tool for securing a metallic wire helix to a wooden member or the like, comprising a member having in its end face a plurality of pressure rollers arranged on a helix of a pitch equal to that of the wire helix, said rollers being rotatably mounted and grooved to contact with the wire helix to embed it by rolling into the wood and force the end thereof securely into the wood; and a guiding device set eccentrically to the helix constituting the geometrical locus of the centers of the pressure rollers to guide the wire to the first of the pressure rollers.

7. A tool for securing a metallic wire helix to a wooden member or the like, comprising a member having in its end face a plurality of pressure rollers arranged on a helix of a pitch equal to that of the wire helix, said rollers being rotatably mounted and grooved to contact with the wire helix to embed it by rolling into the wood and force the end thereof securely into the wood; and a grooved guide roller set eccentrically to the helix constituting the geometrical locus of the centers of the pressure rollers to guide the wire to the first of the pressure rollers.

8. A tool for securing a metallic wire helix to a wooden member of the like, comprising a member having in its end face a plurality of pressure rollers arranged on a helix of a pitch equal to that of the wire helix, said rollers being rotatably mounted and grooved to contact with the wire helix to embed it by rolling into the wood and force the end thereof securely into the wood; and a guide roller having a larger diameter than the pressure rollers and being set eccentrically to the helix constituting the geometrical locus of the center of the pressure rollers to guide the wire to the first of the pressure rollers.

In testimony whereof we affix our signatures.

WILLI HEYNER.
HERMANN HENKEL.